United States Patent [19]
Knight

[11] Patent Number: 5,959,386
[45] Date of Patent: Sep. 28, 1999

[54] PERMANENT MAGNET DC MOTOR AND MAGNET RETENTION CLIP

[75] Inventor: Robert C. Knight, Crowley, Tex.

[73] Assignee: Molded Products Company, Haltom City, Tex.

[21] Appl. No.: 09/009,072

[22] Filed: Jan. 20, 1998

[51] Int. Cl.$^6$ .............................. H02K 21/26; H02K 1/18
[52] U.S. Cl. ............................................ 310/154; 310/218
[58] Field of Search ...................................... 310/154, 218

[56] References Cited

U.S. PATENT DOCUMENTS

| | | | |
|---|---|---|---|
| 3,258,622 | 6/1966 | Gillespie | 310/154 |
| 4,412,145 | 10/1983 | Voss et al. | 310/154 |
| 4,445,060 | 4/1984 | Ruhle et al. | 310/154 |
| 4,453,097 | 6/1984 | Lordo | 310/154 |
| 4,580,072 | 4/1986 | Morishita | 310/154 |
| 4,851,727 | 7/1989 | Tanaka | 310/154 |
| 5,619,084 | 4/1997 | Lan | 310/154 |
| 5,763,974 | 6/1998 | Vacca | 310/154 |

*Primary Examiner*—Clayton LaBalle
*Attorney, Agent, or Firm*—Arthur F Zobal

[57] ABSTRACT

A plurality of retention clips are employed in a DC motor for holding permanent magnets at spaced apart positions in the housing against its annular side wall. The DC motor is of the type having a housing formed by end walls secured to the annular side wall by attaching rods which extend between the end walls inside the annular side wall and are located radially outward of the armature. Each of the retention clips is formed by a thin spring member having two spaced apart clip ends for engaging adjacent ends of two permanent magnets with the spring member extending from one of the clip ends to the other of the clip ends to successively form a first outwardly extending partially open loop, an intermediate inwardly extending partially open loop, and a second outwardly extending partially open loop with the first and second partially open loops having entrances on an inner side of the spring member and the intermediate partially open loop having an entrance on an outer side opposite the inner side. The intermediate partially open loop has an opening for receiving a connecting rod and a neck near the outer side for engaging the connecting rod for preventing radial and angular movement of the spring clip and hence of the adjacent ends of the permanent magnets in the housing.

9 Claims, 4 Drawing Sheets

5,959,386

PERMANENT MAGNET DC MOTOR AND MAGNET RETENTION CLIP

BACKGROUND OF THE INVENTION

1. Field of the Invention

The invention relates to a retention clip for retaining the magnets of a permanent magnet DC motor in the motor housing.

2. Description of the Prior Art

Magnets of permanent magnet DC motors have been retained in the motor housing by clips attached to the motor housing and by bonding the magnets to the motor housing. U.S. Pat. Nos. 4,453,097, and 5,619,084 disclose arrangement and devices for holding the magnets of a permanent magnet DC motor in the motor housing.

SUMMARY OF THE INVENTION

It is an object of the invention to provide a new and unique retention clip for holding the magnets of a permanent magnet DC motor in the motor housing.

The DC motor is of the type having a housing formed by end walls secured to an annular side wall by attaching rods which extend between the end walls inside the annular side wall and are located radially outward of the armature. A plurality of the clips are employed for holding permanent magnets located in the housing chamber against the annular side wall. The clips have clip ends for engaging the adjacent ends of the magnets and structure which engages the attaching rods for preventing radial and angular movement of the clips and hence of the magnets in the housing chamber.

Each of the clips comprises a spring member having an inner side and an outer side with two spaced apart clip ends located near the inner side with the spring member extending from one of the clip ends to the other of the clip ends to form successively or consecutively a first outward extending portion located near the outer side, an intermediate inward extending portion located near the inner side, and a second outward extending portion located near the outer side. Each of the clip ends hold the adjacent ends of two permanent magnets against the annular side wall at spaced apart positions. The inward extending portion of each of the clips has an opening for receiving one of the attaching rods. The inward extending portion of each of the clips has a neck forming an engaging portion which is located between the outer side of the spring member and one of the attaching rods for engaging the attaching rod for preventing radial and angular movement of the clips and hence of the ends of the permanent magnets in the housing chamber.

In the embodiment disclosed the first outwardly extending portion comprises a first partially open loop; the intermediate inward extending portion comprises an intermediate partially open loop; and the second outwardly extending portion comprises a second partially open loop. The first and second partially open loops have entrances on the inner side of the spring member and the intermediate partially open loop has an entrance on the outer side of the spring member.

DESCRIPTION OF THE PREFERRED EMBODIMENTS

Figure 1:
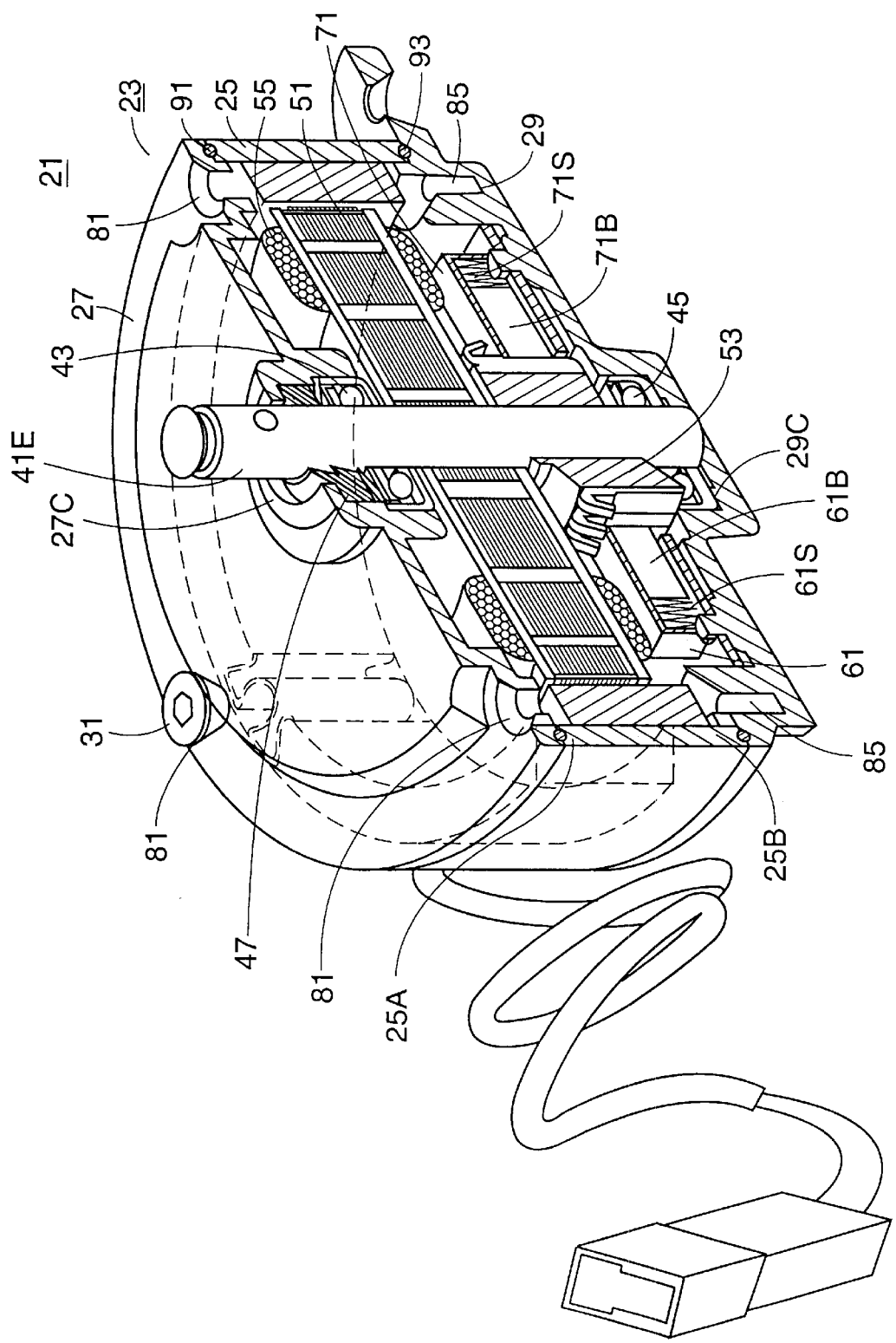
FIG. 1 is a partial cross-section of a DC motor showing one of the retention clips of the invention.
Figure 2:
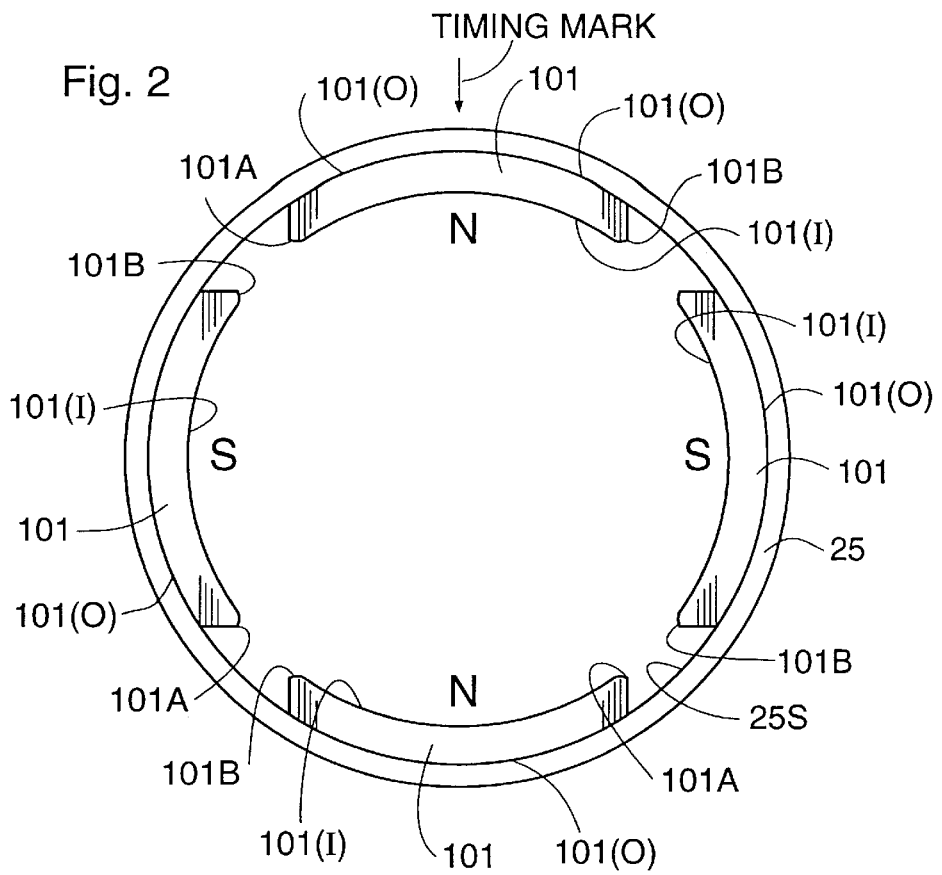
FIG. 2 is a cross section of the annular side wall of a DC motor with permanent magnets located against the inside surface of the annular side wall.

Referring now to the drawings, there is illustrated a DC motor 21 comprising a housing 23 formed by an annular side wall 25 having two circular end walls 27 and 29 connected to opposite side edges of the wall 25 by four spaced apart screws 31 with adjacent screws located 90 degrees apart. Located in the housing chamber at the axis thereof is a shaft 41 supported for rotation by bearings 43 and 45 located in central end portions 27C and 29C respectively. The end 41E of the shaft 41 extends out of the housing chamber for attachment to a fan, etc. Member 47 is a shaft seal.

Secured to the shaft 41 for rotation therewith are an armature 51 and a commutator 53. The armature 41 is formed of lamination with coils 55 wound thereon. Member 61 and 71 are brush holders for holding brushes 61B and 71B biased against the commutator 53 by springs 61S and 71S. A DC voltage is applied across the brushes 61B and 71B by way of leads 63 and 73 for operating the motor.

The end wall 27 has four apertures 81 formed therethrough for receiving the four screws 31 which are screwed into four threaded holes 85 formed in the end wall 29 in alignment with holes 81 for securing the end walls 27 and 29 to the opposite edges 25A and 25B of the annular wall 25. Members 91 and 93 are O-rings seals. The screws 31 are located slightly inward of the inside surface 25S of the wall 25 and radially outward of the armature 51. Located between adjacent screws 31 and radially outward of the armature 51 are permanent magnets 101 which are arcuate in shape and have opposite ends 101A and 101B. An air gap 103 is formed between the inside surfaces 101(I) of the magnets 101 and the outer edge 51E of the armature 51.

Each magnet 101 has arcuate inner and outer surfaces 101(I), 101(O), opposite ends 101A and 101B and opposite side edges 101C and 101D. The length of each magnet 101 along its surfaces 101(I) and 101(O) is such that the magnets 101 can be located against the inside surface 25S at spaced apart positions such that adjacent ends 101A and 101B of adjacent magnets are spaced apart. The dimension 101X between opposite edges 101(C) and 101(D) is such that the magnets extend a substantial distance within the inside dimension 25X of the annular side wall 25 in the housing.

Four spring retention clips 121 are provided for holding the four 101 magnets against the inside surface 25S of the annular side wall 25 between with their adjacent ends 101(A) and 101(B) being located at spaced apart positions.

Figure 6:
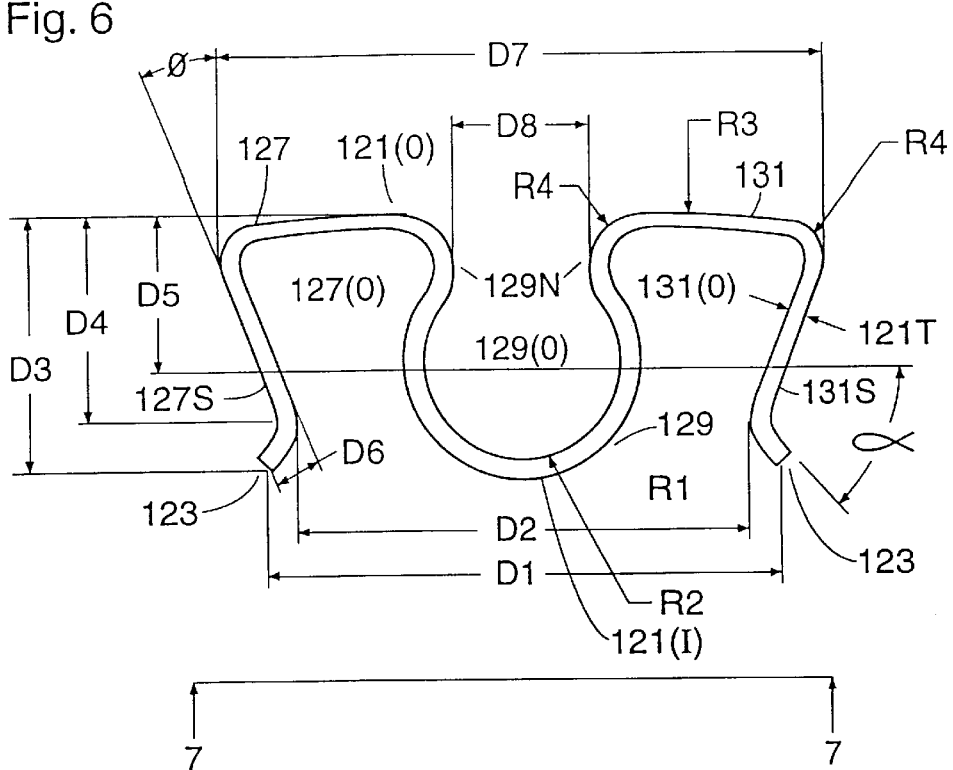
FIG. 6 is an enlarged end view of the retention clip of the invention.
Figure 7:
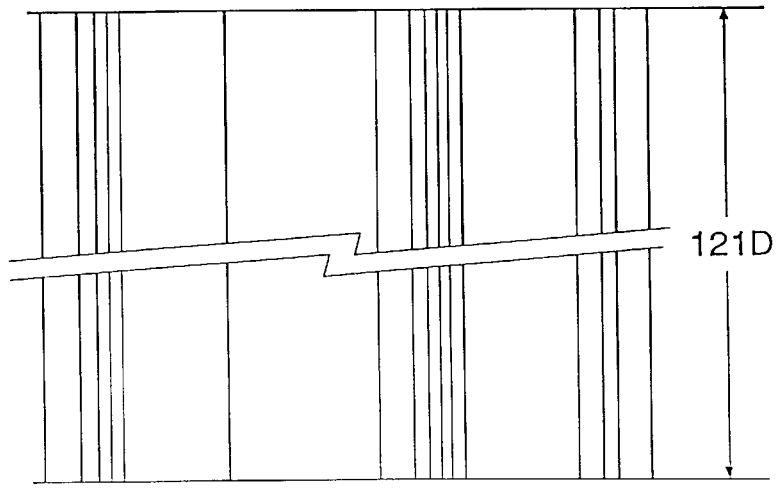
FIG. 7 is a view of FIG. 6 as seen from lines 7—7 thereof.
Figure 8:
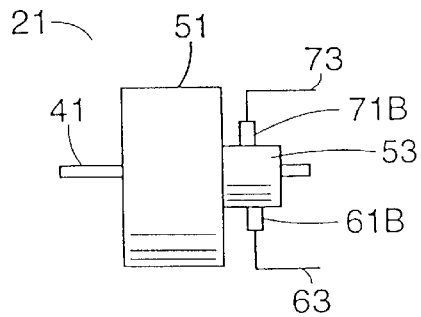
FIG. 8 is an electrical schematic of a portion of the permanent magnet DC motor of FIGS. 1–7.

Each clip 121 is a spring member formed of stainless steel. Referring to FIGS. 6 and 7, each clip 21 has a dimension D7, a thickness 121(T), a dimension 121(D) and a dimension D3 with an inner side 121(I) and an outward side 121(O). The clip 121 has two opposite ends 123 and 125 which are shaped to engage the adjacent ends 101(A) and 101(B) of adjacent magnets 101. The ends 123 and 125 are located at the inner side 121(I). The spring member 121 extends from clip end 123 to clip ends 125 to form successively an outward extending partially open loop portion 127, an inward extending partially open loop portion 129, and an outward extending partially open loop portion 131. The loop portions 127 and 131 have openings 127(O) and 131(O) with entrances extending thereto from the inner side 121(I). The loop portion 129 has an opening 129(O) with an entrance from the outer side 121(O).

The opening 129(O) has a rounded portion for receiving the shaft of a connection screw 31.

Figure 3:
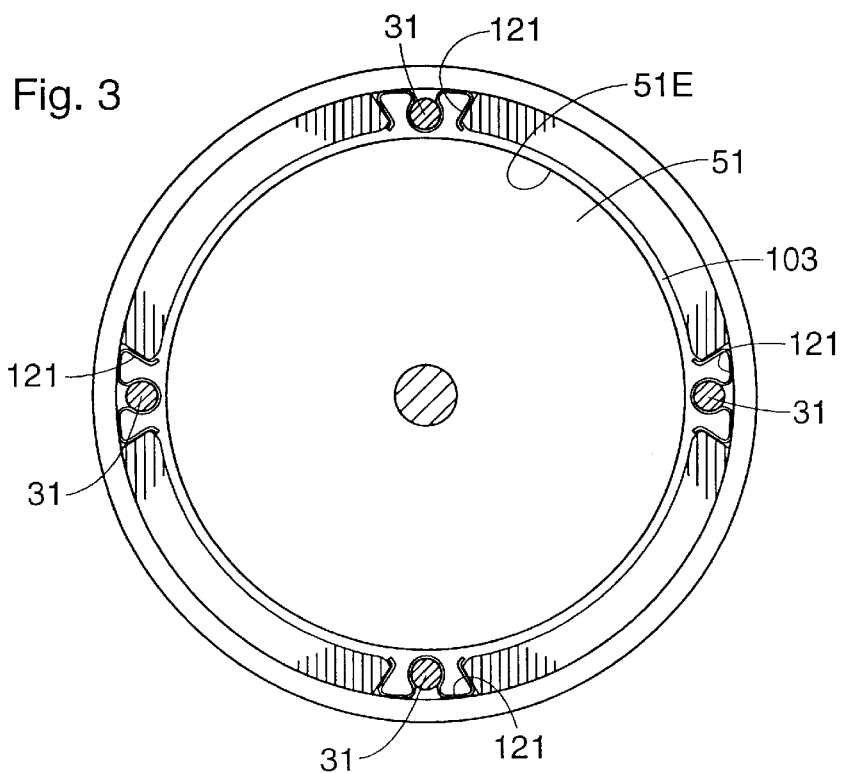
FIG. 3 is a view similar to that of FIG. 2 with the retention clips of the invention for holding the permanent magnets in place.
Figure 4:
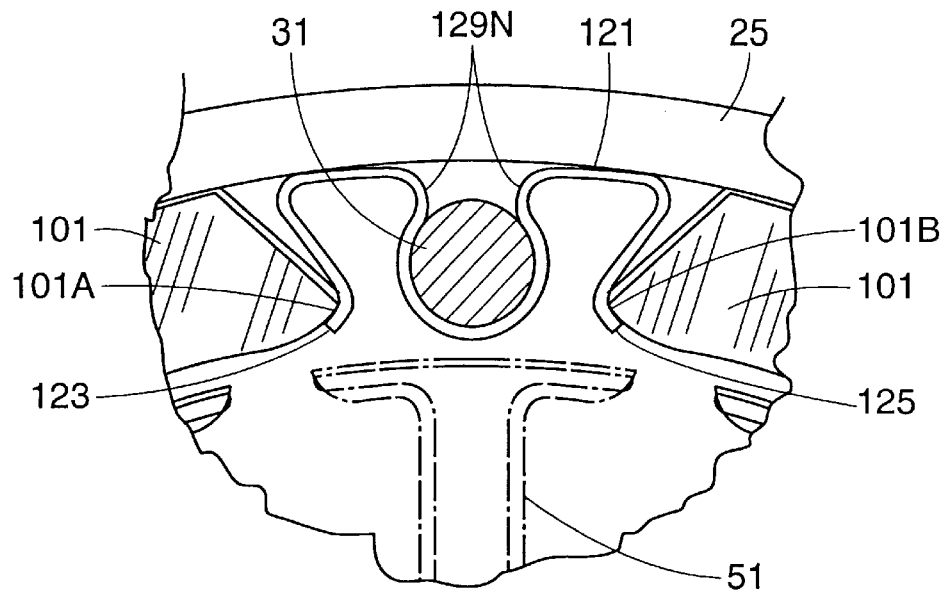
FIG. 4 is an enlarged portion of FIG. 3 illustrating a portion of the armature core laminations without the coil windings.
Figure 5:
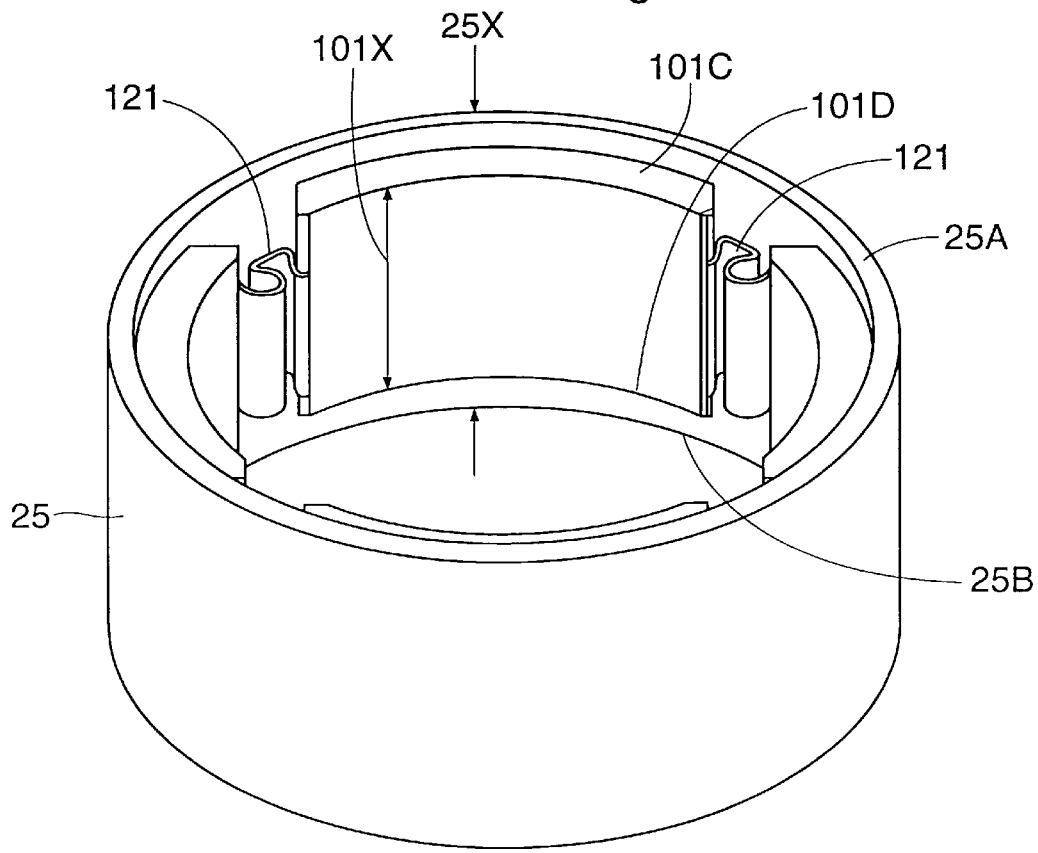
FIG. 5 is an isomeric view of FIG. 3 with the housing assembly screws removed.

The ends 123 and 125 form L-shaped portions with the sides 127(S) and 131(S) of the loops 127 and 129 for gripping the adjacent end 101(B) and 101(A) of adjacent magnets 101 as shown in FIGS. 3 and 4. In this position, the spring member 121 is compressed between its ends 123, 127(S) and 125, 131(S) such that the ends 123 and 125 engage the ends 101(B) and 101(A) of adjacent magnets 101 and hold them against the inside surface 25(S) of the wall 25. This also compresses the loop 129 against the shaft of the screw 31 with the neck portions 129(N) of the loop 129 engaging portions of the back side of the screw 31 thereby preventing radial or angular movement of the spring 101 and hence of the adjacent magnets 101 in the housing.

The retention clips 121 of the invention are easy to install in the DC motor to hold the magnets in place and hence reduces assembly time and cost. During assembly, the screws 31 are extended through the openings 129(O) of the clips 121 and screwed in place and the ends 123 and 125 of the clips are located to engage the ends 101B and 101A of adjacent magnets 101. If disassembly of the motor is required, the screws 31 are removed from the openings 129(O) of the clips 121 and the ends 123 and 125 are removed from the magnet ends 101B and 101A.

In one bodiment, the spring clip 121 in an uncompressed state may have the following dimensions in inches.

D1=0.550; D2=0.455; D3=0.261; D4=0.211; D5=0.147; D6=0.067; D7=0.592; D8=0.142; R1=0.040; R2=0.188; R3=1.88; R4=0.045. The thickness 121(T) may be equal to 0.020 of an inch. The angle theta may be equal to 22 degrees and the angle alpha may be equal to 32 degrees. These dimensions are suitable for magnets 101 having an inside radius of between 3.204 and 3.256 inches with a thickness of about 0.258 of an inch and an outside arcuate length of about 2.050 inches for use in a motor housing having an inside radius of about 1.870 inches. The dimension 121D may be about 0.750 of an inch. It is to be understood that the retention clips 101 may have dimensions different from those listed above and used in DC motors having a different number of permanent magnets, i.e. two permanent magnets.

The permanent magnets 101 may be formed of iron oxide and strontium.

I claim:

1. A permanent magnet DC motor, comprising:

an annular side wall having a central axis and opposite side edges, two end walls coupled to said opposite side edges of said annular side wall forming a housing chamber, a plurality of spaced apart rod members extending through said housing chamber between said two end walls next to said annular side wall for securing said two end walls to said side edges of said annular side wall, a shaft supported by said two end walls at the axis of said annular side wall for rotation, an armature coupled to said shaft within said housing chamber for rotation therewith, said armature having an outer edge spaced inward from said annular side wall, a plurality of spaced apart permanent magnets located at given positions against said annular side wall in said housing chamber radially outward from said armature, each of said permanent magnets being arcuate in shape and having opposite ends, a plurality of retention clips with each retention clip located and engaging the adjacent ends of two permanent magnets for holding said permanent magnets at spaced apart positions against said annular side wall at said given positions, each of said spring clips having an engaging portion for engaging one of said rod members for preventing radial and angular movement of said spring clips and hence of said permanent magnets in said housing chamber, each of said rod members is located at least partially between said engaging portion of one of said spring clips and said outer edge of said armature, each of said retention clips comprises a spring member having an inner side and an outer side with two spaced apart clip ends located near said inner side with said spring member extending from one of said clip ends to the other of said clip ends to form successively a first outward extending portion located near said outer side, an intermediate inward extending portion located near said inner side, and a second outward extending portion located near said outer side, each of said clip ends has an edge portion shaped to engage the end of a permanent magnet such that said spring member has two clip ends which engage and hold the adjacent ends of two permanent magnets against said side wall at spaced apart positions, said inward extending portion of each of said spring clips has an opening for receiving one of said rod members, said inward extending portion of each of said spring clips has a neck forming said engaging portion which is located near said outer side.

2. The permanent magnet DC motor of claim 1, wherein:

said first outwardly extending portion comprises a first partially open loop, said intermediate inward extending portion comprises an intermediate partially open loop, said second outwardly extending portion comprises a second partially open loop, said first and second partially open loops have entrances on said inner side of said spring member, said intermediate partially open loop has an entrance on said outer side of said spring member.

3. A permanent magnet DC motor, comprising:

an annular side wall having a central axis and spaced apart opposite side edges, two end walls coupled to said opposite side edges of said annular side wall forming a housing chamber;

a plurality of spaced apart rod members extending through said housing chamber between said two end walls next to said annular side wall;

a shaft supported by said two end walls at the axis of said annular side wall for rotation, an armature coupled to said shaft within said housing chamber for rotation therewith;

said armature having an outer edge spaced inward from said annular side wall;

a plurality of spaced apart permanent magnets located at given positions against said annular side wall in said housing chamber radially outward from said armature;

each of said permanent magnets being arcuate in shape and having opposite ends;

a plurality of retention clips with each retention clip located and engaging the adjacent ends of the two permanent magnets for holding said permanent magnets at spaced apart positions against said annular side wall at said given positions;

each of said spring clips comprising:

a thin spring member having two spaced apart clip ends for engaging adjacent ends of two permanent magnets with said spring member extending from one of said clip ends to the other of said clip ends to successively form a first outwardly extending partially open loop, an intermediate inwardly extending partially open loop, and a second outwardly extending partially open loop with said first and second partially open loops having entrances on an inner side of said spring member and said intermediate partially open loop having an entrance on an outer side opposite said inner side, said spring member having first and second spaced apart edges with said two spaced apart clip ends and said loops extending between said first and second spaced apart edges, said intermediate partially open loop having an opening extending between said first and second spaced apart edges for receiving one of said rod members and a neck near said outer side for engaging said rod member for preventing radial and angular movement of said spring clip and hence of said adjacent ends of said permanent magnets in said housing chamber.

4. The permanent magnet DC motor of claim 3, wherein:

said neck of said spring clips engage said rod members along a substantial portion of their lengths in said housing chamber.

5. The permanent magnet DC motor of claim 3, wherein:

said intermediate partially open loop comprising two side walls which extend away from each other from said inner side and then toward each other to form said neck, said first and second outwardly extending partially open loops comprising elongated portions of said two clip ends respectively which extend toward each other from said outer side.

6. The permanent magnet DC motor of claim 5, wherein:

said two clip ends comprising two transverse portions joined to said two elongated portions respectively with said two transverse portions extending away from each other from their elongated portions to free ends.

7. A retention clip for use in the housing chamber of a permanent magnet DC motor for receiving a connecting rod used for connecting two ends to an annular side wall to form a housing chamber and for holding the adjacent ends of two permanent magnets against the annular side wall in the housing chamber, comprising:

a thin spring member having two spaced apart clip ends for engaging adjacent ends of two permanent magnets with said spring member extending from one of said clip ends to the other of said clip ends to successively form a first outwardly extending partially open loop, an intermediate inwardly extending partially open loop, and a second outwardly extending partially open loop with said first and second partially open loops having entrances on an inner side of said spring member and said intermediate partially open loop having an entrance on an outer side opposite said inner side, said spring member having first and second spaced apart edges with said two spaced apart clip ends and said loops extending between said first and second spaced apart edges, said intermediate partially open loop having an opening extending between said first and second spaced apart edges for receiving a connecting rod and a neck near said outer side for engaging the connecting rod for preventing radial and angular movement of said spring clip and hence of the adjacent ends of the permanent magnets in the housing chamber.

8. The retention clip of claim 7, wherein:

said intermediate partially open loop comprising two side walls which extend away from each other from said inner side and then toward each other to form said neck, said first and second outwardly extending partially open loops comprising elongated portions of said two clip ends respectively which extend toward each other from said outer side.

9. The retention claim of claim 8, wherein:

said two clip ends comprising two transverse portions joined to said two elongated portions respectively with said two transverse portions extending away from each other from their elongated portions to free ends.

\* \* \* \* \*